United States Patent Office 2,880,557
Patented Apr. 7, 1959

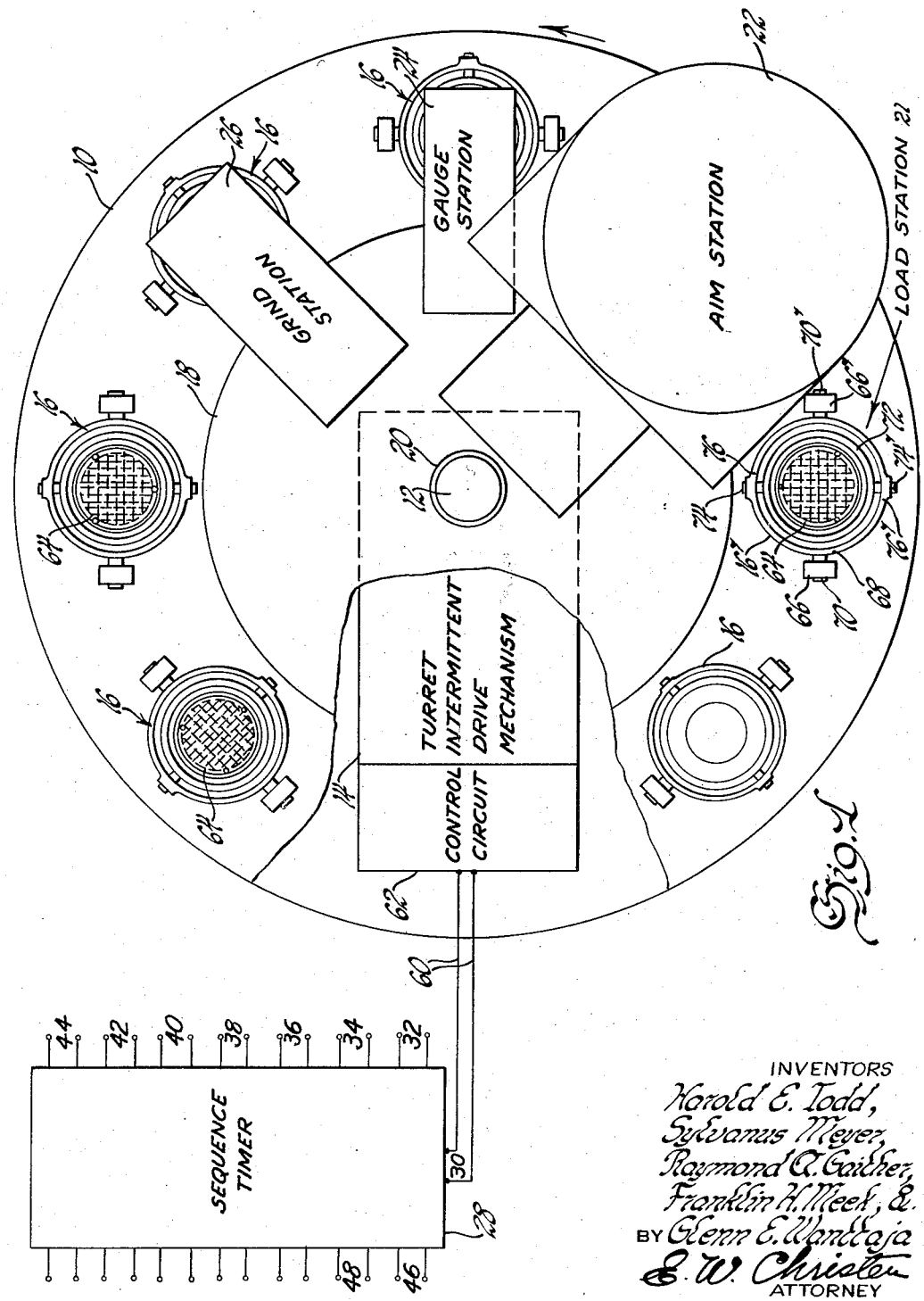

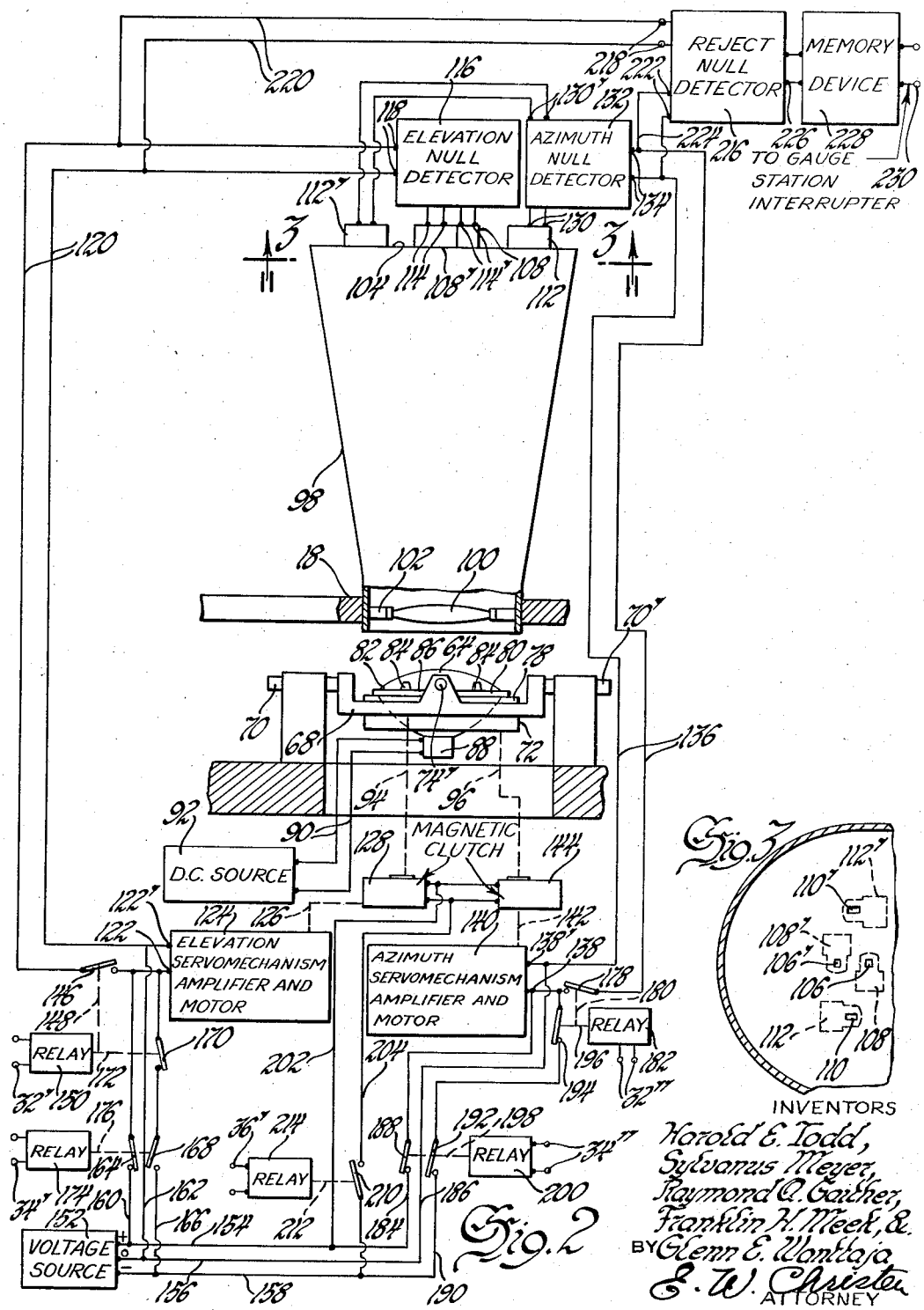

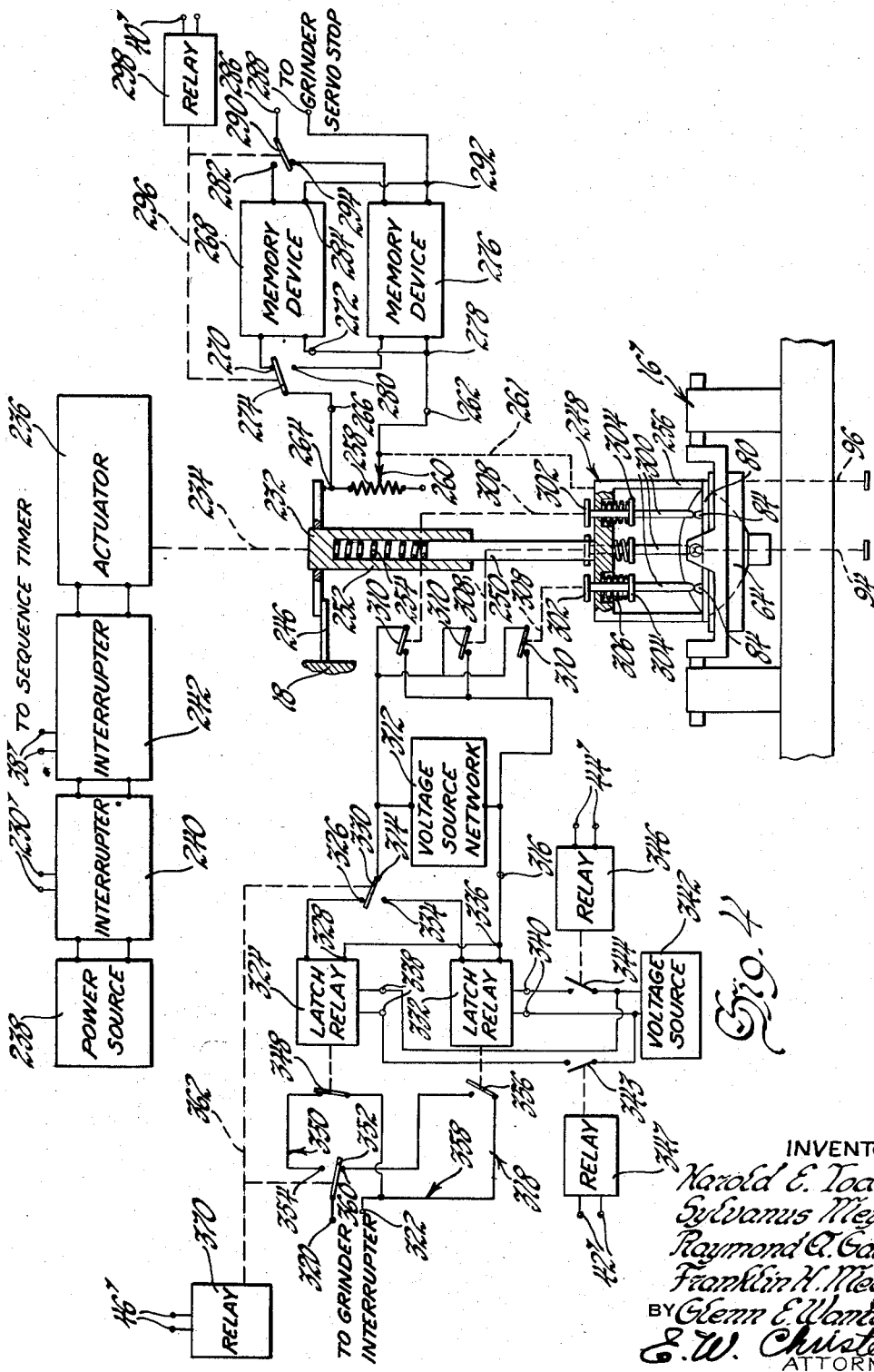

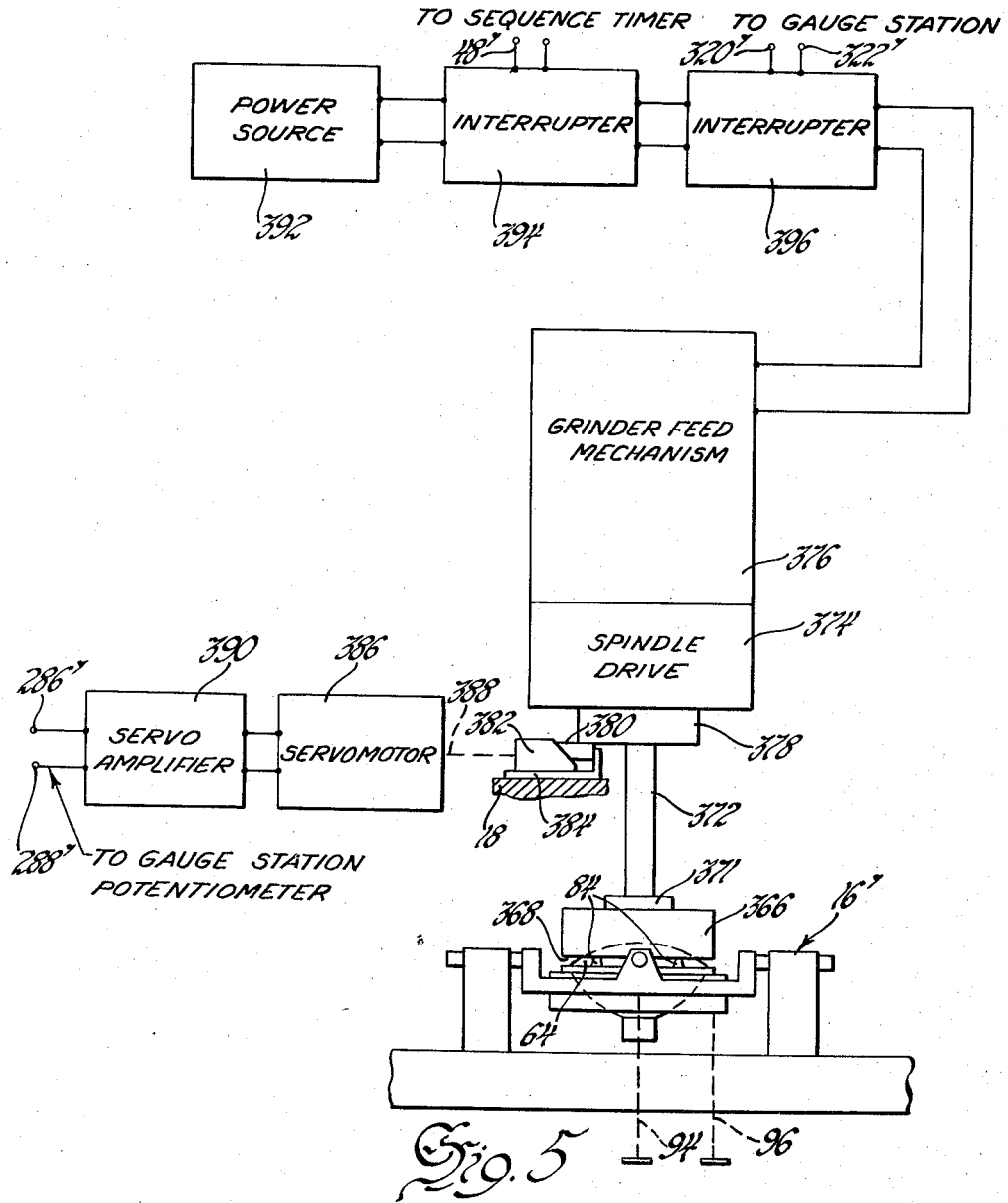

2,880,557

HEADLAMP PRE-AIMING APPARATUS

Harold E. Todd and Sylvanus Meyer, Anderson, Raymond A. Gaither, Pendleton, and Franklin H. Meek, Anderson, Ind., and Glenn E. Wanttaja, Royal Oak, Mich., assignors to General Motors Corporation, Detroit, Mich., a corporation of Delaware Application September 1, 1955, Serial No. 531,886

19 Claims. (Cl. 51—134)

This invention relates to the manufacture of lamps and more particularly to apparatus for manufacturing projection lamps of the type which is provided with an aiming plane having a known disposition with respect to the direction of the light beam projected therefrom. Lamps of this type are referred to herein as pre-aimed lamps. The type of pre-aimed lamp disclosed herein in conjunction with the illustrative embodiment of the invention is fully described and claimed in the United States patent application Serial No. 515,684 entitled Pre-Aimed Light Projector, filed June 15, 1955 in the names of Charles F. Arnold and Edward N. Cole, and assigned to the assignee of this application.

The feature of pre-aiming, such as that disclosed in the aforementioned application, permits aiming of a projection lamp, upon installation for use, by means of a geometrical instrument with precision previously obtained only by optical aiming. In general, this is accomplished by providing on the lamp structure an aiming plane having a known angular relation to the direction of the light beam projected from the lamp. The desirability of pre-aimed projection lamps, especially vehicle headlamps, becomes apparent from considerations of presently known lamp production techniques and desired lamp performance.

In the manufacture of projection lamps such as vehicle headlamps, optical imperfections occur among successive lamps manufactured by the same apparatus and technique. This optical imperfection is manifested by lack of uniform relationship of the light beam direction and a selected geometrical axis of the lamp structure. Such relationship for each lamp is unknown and varies randomly because of insufficient precision in the relative positioning and characteristics of the parts of the optical system. Although there has been much effort to improve the manufacturing technique to insure the required precision, this effort has not yielded a commercially successful, optically perfect lamp. Consequently, the aiming of projection lamps, particularly vehicle headlamps, with great accuracy has constituted an important problem in the development of improved vehicle lighting.

The numerous approaches in the prior art to the problem of aiming vehicle headlamps may be characterized generally as either optical aiming or geometrical aiming. In optical aiming the lamp is mounted on the vehicle and illuminated; the light beam is directed upon a simple, remotely located aiming screen or a more complex optical equivalent and the beam pattern is positioned by directional adjustment of the lamp. Optical aiming of this type has proved to be disadvantageous because it requires elaborate equipment. It is, however, quite accurate. In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. The aiming may be performed quickly and without the necessity of large space. Until the development of the pre-aimed lamp, geometrical aiming was inaccurate because the relation between the projected light beam direction and the selected axis of the lamp structure was unknown. In the pre-aimed lamp, however, this relation is incorporated with a known value into the lamp structure. Thus geometrical aiming may be accomplished with the precision of optical aiming.

The present-day commercial practice in the manufacture of lamps affords compelling advantages of efficient production even though it yields optically imperfect lamps. It is desirable, of course, to retain these advantages in the production of pre-aimed lamps. However, the provision of the pre-aim feature requires an additional step in the manufacture of projection lamps and in order for a pre-aimed lamp to be produced economically so that it may attain widespread acceptance, production apparatus capable of high volume production is necessary. The production rate of the apparatus for providing the pre-aim feature must be consistent with that of the apparatus for assembling the lamp itself. Additionally, the apparatus must be capable of performing the necessary operations upon the lamp structure with great precision so that each lamp may be aimed by a geometrical instrument with the accuracy of optical aiming.

Accordingly, it is an object of this invention to provide apparatus for manufacturing projection lamps of the pre-aimed type at a high rate of production and with great precision.

It is an additional object of the invention to provide means for accurately and rapidly ascertaining the direction of a projected light beam of a lamp and for defining a reference surface on the lamp in accordance with that ascertainment.

It is a further object of this invention to provide apparatus for optically aiming the light beam of a projection lamp and for providing the lamp structure with an aiming surface in a known relation to the direction of the light beam so that the lamp is adapted for geometrical aiming with optical precision.

A further object is to provide apparatus for automatically aiming the light beam of a projection lamp and for cutting a surface on the lamp structure in a known angular relation to the direction of the light beam.

A further object of this invention is to provide automatic apparatus for aiming the light beam of a projection lamp, determining the structural alteration required for providing an aiming plane on the lamp, and altering the structure in accordance with that determination.

Another object is to provide automatic apparatus for performing sequential operations upon a lamp at successive stations, including aiming and modifying the lamp structure, and for controlling the operations of one station in accordance with information obtained at another.

In the attainment of the foregoing objects, there is provided a dirigible support for the lamp permitting its displacement about coordinate axes with reference to optical aiming means which are adapted to detect the directivity of the light beam projected from the lamp. The light beam direction is established in a desired position with reference to the optical aiming means and the lamp is secured in position. An aiming surface having a known disposition with respect to the optical aiming means, and hence the light beam direction, is provided on the lamp by modification of the lamp structure. Means may be provided for determining the extent of modification required for each lamp.

A more complete understanding of the invention may be had from the detailed description which follows taken with the accompanying drawings in which:

Figure 1 is a plan view of the apparatus showing the arrangement of the operating stations.

Figure 2 is an elevation view of the aiming station including a schematic representation of the control circuits.

Figure 3 is a view of part of the aiming station taken on lines 3—3 of Figure 2.

Figure 4 is a view in elevation of the gauge station including a schematic representation of the control circuits.

Figure 5 is a view in elevation of the grinding station including a schematic representation of the control circuits.

In the interest of clarity, the apparatus is represented in the drawings in a somewhat diagrammatic manner. To emphasize the inventive features and to avoid obscuring the invention with detail, conventional components necessary to an operative system are represented schematically or symbolically. For example, the electronic stages of conventional design are represented in block diagram and mechanical connections and devices commercially available or well known in the art are represented schematically.

General description of the apparatus

Referring now to the drawings there is shown an illustrative embodiment of the invention in a turret type machine adapted for a high rate of production of pre-aimed projection lamps, specifically, vehicle headlamps of the type including an integrally joined reflector and lens enclosing a light source, known in the art as the sealed beam lamp. In Figure 1 there is shown in plan view a rotatable table or turret 10 supported for rotation upon a shaft 12 which is driven by the intermittent drive mechanism 14. The turret 10 supports a plurality of identical support or aiming heads 16 including 16' in equally spaced relation about the circumference of the turret. A fixed table 18, mounted on the fixed support member 20, supports a plurality of operating stations 22, 24 and 26 disposed circumferentially of the turret 10 and adjacent the aiming heads 16.

The drive mechanism 14, under the control of a sequence timer 28, is adapted to impart intermittent rotation to the turret 10 causing each of the aiming heads 16 to advance one station during a drive interval and to remain stationary at such station during a dwell interval. The sequence timer 28 is adapted to energize in timed sequence a plurality of electrical output terminals 30, 32, 34, etc., through 48 by means of a multiple cam switch or the like driven by an independent motor, not shown. The output terminals 30 are connected by conductors 60 to the control circuit 62 which intermittently energizes the drive mechanism 14. The apparatus thus far described, with the exception of the specific structure of the aiming heads 16, is well known in the art of lamp manufacture and is often referred to as a rotary or turret index machine.

The aiming heads

Each of the support or aiming heads 16 is adapted to dirigibly support a projection lamp 64 for movement about coordinate axes and comprises a pair of spaced trunnions 66 and 66' mounted on the turret 10. An outer gimbal ring 68 is supported by journals 70 and 70' in the trunnions having bearing surfaces which offer substantial frictional resistance to rotation of the journals. An inner gimbal ring 72 is supported by journals 74 and 74' in frictional bearing surfaces 76 and 76', respectively, on the outer gimbal ring 68.

The inner gimbal ring 72 is adapted to support the lamp 64 upon a seating surface 78, as shown in Figure 2. The lamp 64 is provided with the usual seating flange or rim 80 which is seated against the surface 78. The lamp 64 is oriented with respect to the seating surface 78 by any suitable means such as the usual orienting lugs on the rear surface of the seating rim 80 and coacting recesses in the surface 78, not shown. In the illustrative embodiment, the orientation is such that the axis of the lamp about which the lamp is rotated for adjustment in the vertical plane when installed for use, herein referred to as the lamp elevation axis, is parallel to the axis of journals 70 and 70' which will be referred to as the aiming head elevation axis. Likewise, the axis of the lamp about which it is rotated for adjustment in the horizontal plane when installed for use, herein referred to as the lamp azimuth axis, is parallel to the axis of the journals 74 and 74', termed the aiming head azimuth axis. The lamp 64 is provided on the front surface or lens 82 with a plurality of aiming projections or bosses 84 preferably disposed equidistantly about the circumference and adjacent the periphery of the lens 82. The projections 84 are preferably molded integrally with lens 82. At this intermediate stage of production the projections 84 are of uniform height above the annular surface 86 of the rim 80 except in those cases of defectively molded lenses or fractured projections.

It is to be noted that the aiming head elevation axis through journals 70 and 70' and the azimuth axis through journals 74 and 74' lie in a common plane which is substantially tangent to the outermost end of each of the projections 84. This relation is effective to minimize lateral displacement of the projections 84 when the lamp 64 is rotated about the azimuth and elevation axes. The desirability of this feature will become apparent subsequently. Each of the aiming heads 16 is provided with an electrical receptacle 88 adapted to receive the terminal lugs (not shown) of the lamp 64. The receptacle 88 is energized through conductors 90 from the direct current source 92. The receptacle establishes electrical contact with the terminals of the lamps and is adapted to energize a selected filament, either the upper beam or lower beam filament but preferably the former in the case of a plural filament lamp. Depending from the outer gimbal 68 at a point displaced from the axis of the journals 70 and 70' is a shaft or rod 94 adapted to impart rotation to the lamp 64 about the lamp elevation axis. A shaft or rod 96 depends from the inner gimbal 72 at a point displaced from the axis of journals 74 and 74' and is adapted to impart rotation to the lamp 64 about the lamp azimuth axis. The actuating means for the shafts 94 and 96 will be described presently.

When the turret intermittent drive mechanism is energized by the sequence timer 28, the turret 10 carrying the aiming heads 16 and 16' is rotatably driven in a counterclockwise direction and the aiming head 16' is indexed into the load station 21. At this station, during the dwell interval of the turret 10, an operator loads the projection lamp 64 into the head 16' and the lamp is secured in the oriented position on the inner gimbal 72 by any suitable clamping means (not shown).

The aim station

After the loading operation, the drive mechanism 14 is again energized and the turret 10 is rotated, indexing the aiming head 16' with the lamp 64 from station 21 to station 22. At station 22 automatic aiming apparatus is mounted which is adapted to effect an aiming operation of the lamp 64 during the dwell interval of the turret 10. At station 22, as shown in Figures 2 and 3, the fixed table 18 supports an enclosure member 98 which supports at its lower end a condensing lens 100 by an annular bracket 102. The enclosure member 98 terminates at its upper end in an aiming screen 104 defining a reference surface in axial alignment with the axis of the lens 100 and in alignment with the aiming head 16'. The aiming screen 104 is provided with a pair of spaced apertures 106 and 106' disposed on a line extending perpendicular to the aiming head elevation axis. Disposed in alignment with the apertures 106 and 106' and behind the aiming screen 104 are light intensity responsive pick-up elements such as photocells 108 and 108', respectively. Similarly, the aiming screen 104 defines a pair of spaced apertures 110 and 110' disposed on a line extending perpendicular to the azimuth axis of the aiming head 16'. Light responsive pick-up elements or photocells 112 and 112' are disposed in alignment with the apertures 110 and 110', respectively, and behind the aiming screen 104.

The elevation pick-up elements 108 and 108' are electrically connected to the input terminals 114 and 114', respectively, of the elevation null detector circuit 116. An output signal of the elevation null detector 116 is developed across output terminals 118 and is applied by conductors 120 to the input terminals 122 and 122' of the elevation servomechanism amplifier and motor 124. The mechanical output of the elevation servomechanism motor is transmitted through the shaft or plunger 126 which supports at one end the magnetic clutch 128. The magnetic clutch 128 is adapted when energized to engage the shaft or rod 94 for actuation of the outer gimbal 68. By a similar connection, the output voltages of the pick-up elements 112 and 112' are applied to the input terminals 130 and 130', respectively, of the azimuth null detector 132. The azimuth null detector 132 develops an output voltage across terminals 134 which is applied by conductors 136 to the input terminals 138 and 138' of the azimuth servomechanism amplifier and motor 140. The mechanical output of the azimuth servomechanism motor is transmitted by shaft or plunger 142 to magnetic clutch 144 which is adapted when energized to engage the shaft or push rod 96 connected to the inner gimbal 72.

The null detectors 116 and 132 may be of conventional design of any well known type suitable for producing an output voltage proportional to the difference in amplitude of a pair of input voltages. Similarly, the servomechanism including amplifiers and motors 124 and 140 may be of a conventional design which produces an output displacement proportional to the amplitude of an input voltage and in a direction corresponding to the phase or polarity of the input voltage.

The elevation servomechanism amplifier and motor 124 and the azimuth servomechanism amplifier and motor 140 are furnished with control voltages which are sequentially applied under control of the sequence timer 28 in order to coordinate the action of the shafts 126 and 142 with the movement of the rotatable turret 10. A switch 146, normally open, is interposed in one of the conductors 120 and is actuated through a mechanical linkage 148 by a relay 150. The relay 150 is provided with input terminals 32' connected to the terminals 32 of the sequence timer 28. A voltage source 152 supplies a voltage of one polarity across the conductors 154 and 156 and a voltage of the opposite polarity across the conductors 158 and 156. The conductors 154 and 156 are connected to input terminals 122 and 122' by conductors 160 and 162, respectively, through normally closed switch 164. The conductors 158 and 156 are connected through conductors 166 and 162 to input terminals 122 and 122', respectively, through serially connected, normally open switch 168 and normally closed switch 170. The normally closed switch 170 is actuated by the relay 150 through a mechanical linkage 172 ganged with the linkage 148. The normally closed switch 164 and the normally open switch 168 are actuated by relay 174 through mechanical linkage 176. The relay 174 has a pair of input terminals 34' connected to the terminals 34 of the sequence timer 28. In a similar connection, normally open switch 178 is interposed in one of the conductors 136 and is actuated through a mechanical linkage 180 by a relay 182 having input terminals 32" which are connected to terminals 32 of the sequence' timer 28. The conductors 154 and 156 are connected by conductors 184 and 186 to the input terminals 138 and 138', respectively, through the normally closed switch 188. The conductors 158 and 156 are connected by conductors 190 and 186 to the input terminals 138 and 138', respectively, through serially connected normally open switch 192 and normally closed switch 194. The switch 194 is actuated by relay 182 through linkage 196 ganged to linkage 180. The switches 188 and 192 are actuated through linkage 198 by relay 200 having input terminals 34" connected to terminals 34 of sequence timer 28.

The magnetic clutches 128 and 144 are adapted to be energized from conductors 154 and 158 by connection through conductors 202 and 204 which are connected to the input terminals of the clutches through normally open switch 210 in conductor 204. The switch 210 is actuated through a linkage 212 by relay 214 having input terminals 36' connected to terminals 36 of the sequence timer 28.

A reject null detector 216 is provided with a first pair of input terminals 218 connected by the pair of conductors 220 to the output terminals 118 of the elevation null detector 116. A second pair of input terminals 222 are connected by a pair of conductors 224 to the output terminals 134 of the azimuth null detector 132. The reject null detector may be of the conventional type of detector adapted to produce a null output voltage in response to null input voltage. A pair of output terminals 226 of the reject null detector is connected to a memory device 228 having output terminals 230 which are connected as indicated to apparatus at a subsequent operating station.

At this point, the operation of the aiming station apparatus will be described, assuming that the loading operation of the lamp 64 into aiming head 16' has been completed at the load station 21. As the rotatable turret 10 indexes the aiming head 16' into the aiming station 22, the condition of the switches, previously described, is that shown in Figure 2. The clutches 128 and 144 are de-energized by the normally open condition of the switch 210. The elevation servomechanism amplifier and motor 124 is supplied with a control voltage of the polarity indicated from the voltage source 152 through conductors 160 and 162, including normally closed switch 164, to the input terminals 122 and 122'. Similarly, the azimuth servomechanism amplifier and motor 140 is supplied a control voltage of the same polarity by conductors 154 and 156 through conductors 184 and 186, including normally closed switch 188, to the input terminals 138 and 138'. The polarity of this control voltage is such that the elevation and azimuth servomechanism motors drive the respective shafts 126 and 142 to the fully retracted or down position carrying therewith the clutches 128 and 144.

Upon completion of the indexing of the aiming head 16' into station 22 as controlled by the sequence timer 28, the timer terminals 34 energize the relay 174 which opens switch 164 and closes switch 168. This is effective to reverse the control voltage applied to the input terminals 122 and 122' of the elevation servomechanism amplifier and motor 124. This control voltage is applied from conductors 158 and 156 through conductors 166 and 162. This reversal of control voltage causes the elevation servomechanism amplifier and motor to displace its output shaft 126 and associated clutch 128 to the other limit of travel or the fully extended position. Simultaneously with the energization of relay 174, the relay 200 is energized by the sequence timer terminals 34 and relay 200 closes switch 192 and opens switch 188. The polarity of the voltage applied to the input terminals 138 and 138' of the azimuth servomechanism amplifier and motor is thereby reversed and the shaft 142 associated clutch 144 is displaced to its other limit of travel or the fully extended position. The travel of the servomechanism output shafts 126 and 142 to the fully extended position causes the clutches 128 and 144 to engage and displace the rods 94 and 96, respectively. Upon the occurrence of this engagement, the relay 214 is energized by the sequence timer terminals 36. Energization of the relay 214 closes the switch 210 which energizes the clutches 128 and 144 from the supply conductors 154 and 158 through conductors 202 and 204. The energized magnetic clutches 128 and 144 are coupled by magnetic attraction to the respective rods 94 and 96. With the rods 94 and 96 in the upper limit of travel position, the outer gimbal 68 and the inner gimbal 72 are tilted to one extreme position about the respective elevation and azimuth axes.

With the aiming head 16' and lamp 64 in this condition of extreme displacement about the elevation and azimuth axes, the relays 150 and 182 are energized simultaneously by the sequence timer terminals 32. The energization of relay 150 opens switch 170, removing the control voltage supplied to conductors 158 and 156, and closes the switch 146. Closure of switch 146 is effective to apply the elevation null detector signal from the output terminals 118 through the conductors 120 to the input terminals 122 and 122' of the elevation servomechanism amplifier. Energization of relay 182 opens switch 194 and closes switch 178 which is effective to apply the output signal from the azimuth null detector 132 to the input terminals 138 and 138' of the azimuth servomechanism amplifier. The apparatus is now conditioned for automatic aiming of the lamp 64. The initial displacement of the aiming head 16' and lamp 64 about the azimuth and elevation axes to one extreme position assures that the light beam pattern projected from the lamp 64 and through the condensing lens 100 to the aiming screen 104 will be non-symmetrical with respect to the location of the apertures 106 and 106' and with respect to the apertures 110 and 110'. Thus, the intensity of the light impinging upon one of the photocell pickups 108 and 108' will exceed that impinging upon the other and the pickup elements will deliver signals of different amplitude to the respective input terminals 114 and 114' of the elevation null detector. The output voltage of the elevation null detector 116 developed across terminals 118 is proportional in amplitude to the extent of the unbalance and of a polarity corresponding to the sense of the unbalance. This voltage, applied by way of the conductors 120 to the input terminals 122 and 122' of the elevation servomechanism amplifier and motor, causes the servomechanism motor to drive the output shaft 126 and the outer gimbal 68 so that the lamp 64 is rotated about the elevation axis to a position in which the light impinging upon the photocell pickups 108 and 108' is equal in intensity. Similarly, the voltages developed by the azimuth pickup elements 112 and 112' are initially unequal and the voltage developed by the azimuth null detector 132 across output terminals 134 is applied through conductors 136 to the input terminals 138 and 138' of the azimuth servomechanism amplifier. The azimuth servomechanism motor displaces the inner gimbal 72 through the output shaft 142 to rotate the lamp 64 about the azimuth axis until a null condition is reached.

After the elapse of a sufficient time for the elevation and azimuth servomotors to displace the inner gimbal 72 and outer gimbal 68, respectively, to the position at which null voltages occur at the output terminals of the elevation null detector and the azimuth null detector, the sequence timer de-energizes relay 214. This causes the switch 210 to open, de-energizing the magnetic clutches 128 and 144 to interrupt the coupling thereof with rods 94 and 96. At the same time, the sequence timer de-energizes the relays 150, 174, 182 and 200. De-energization of relay 150 closes switch 170 and opens switch 146. De-energization of relay 174 closes switch 164 and opens switch 168 thus applying the voltage across conductors 154 and 156 to the input terminals of the elevation servomechanism amplifier and motor. The polarity of this voltage causes the motor to displace the shaft 126 and the clutch 128 to the fully retracted position. In the same manner, de-energization of relays 182 and 200 connects the voltage across conductors 154 and 156 to the input terminals of the azimuth servomechanism amplifier and motor causing the shaft 142 and clutch 144 to be displaced to the fully retracted position. Thus, the aiming operation at the station 22 is completed and the aiming head 16' carrying the projection lamp 64 is positioned so that the light beam projected from the lamp has a known directivity with respect to the reference plane defined by the aiming screen 104. The aiming head 16' is retained in this position throughout subsequent operations by virtue of the frictional constraint imposed upon the elevation axis journals 70 and 70' and the azimuth axis journals 74 and 74' by the respective bearing surfaces.

The apparatus at the aiming station 22 and the aiming head 16' is now conditioned to permit rotation of the turret 10 to the gauge station 24. The sequence timer 28 energizes the control circuit 62 through terminals 30 causing the turret drive mechanism to index the aiming head 16' into the gauge station 24.

In the event that the lamp 64 is defective so that proper aim cannot be obtained, means are provided to detect this condition and disable the operating means at subsequent stations. The reject null detector 216 produces an output voltage at its terminals 226 if either the elevation null detector or the azimuth null detector has failed to reach a null condition during the aiming operation. The reject null detector output voltage is applied through terminals 226 to the memory device 228. The memory device assumes one condition in response to a voltage at its input terminals 226 and assumes another condition in the absence of a voltage on the input terminals 226, i.e., when a null voltage is realized. The memory device 228 may take the form of the memory device 318 to be described in detail subsequently. The information stored in the memory device 228 is applied by way of terminals 230 to control the operation of the gauge station 24 which will be described presently.

*The gauge station*

The gauge station 24 comprises a reference head 232 disposed vertically above and in alignment with the aiming head 16' and connected for vertical reciprocation by a shaft 234 to an actuator 236, suitably hydraulic or electrical. Energy is supplied to the actuator 236 from a power source 238 through serially connected interrupters 240 and 242. The interrupter 240 is effective when actuated to disable the actuator 236 and has input terminals 230' connected to the output terminals 230 of the memory device 228 at the aiming station. The interrupter 242 exercises similar control over actuator 236 and has input terminals 38' connected to terminals 38 of the sequence timer.

Disposed in the path of the reference head 232 is a mechanical stop mechanism 246 supported on a fixed portion of the apparatus 18. The reference head 232 includes a cylinder 252 from which is supported a gauge head 248 by plunger 250 seated against the spring 254. The gauge head 248 is provided with an annular seating ring 256 which is adapted to engage the upper surface 86 of the rim 80 on lamp 64. Interposed between the reference head 232 and the gauge head 248 is a transducer such as a slidewire potentiometer 258 for measuring the distance between the reference head when it is seated against the stop 246 and the gauge head when it is seated against the rim 80. The movable contact 260 of the potentiometer is supported by mechanical connection 261 on gauge head 248 and is electrically connected to terminal 262. The fixed contact 264 of the potentiometer on reference head 232 is electrically connected to the terminal 266. A memory device 268 having input terminals 270 and 272 is adapted to be connected across the terminals 262 and 266 by a switch 274 in one position. A memory device 276 having input terminals 278 and 280 is adapted to be connected across terminals 262 and 266 by the switch 274 in the alternate position. The output terminals 282 and 284 of the memory device 268 are adapted to be connected across terminals 286 and 288 by a switch 290 in one position. Similarly, the output terminals 292 and 294 of the memory device 276 are adapted to be connected across the terminals 286 and 288 by the switch 290 in the other position. The switches 274 and 290 are ganged together by mechanical linkage 296 and actuated by a relay 298 having input terminals 40' connected to sequence timer terminals 40. It will be noted that when the switch 274 is closed against the upper contact 270 to connect the potentiometer terminals 266 and 262 to the memory device 268, the switch 290 is closed against the lower contact 294 to connect the terminals 286 and 288 across the output terminals 294 and 292 of the memory device 276.

The memory devices 286 and 276 may take any conventional form suitable for measuring the magnitude of the output of a transducer and retaining the measured value, by circuit elements or the like, until the output value of the transducer is changed. For example, this may be accomplished by any well known form of servomechanism such as a self-balancing potentiometer.

Upon the gauge head 248 are mounted three spaced plungers 300 in alignment with respective aiming projections 84. Each of the plungers 300 extends through the aiming head 248 and terminates in a shouldered portion 302 which limits the downward travel of the plunger. Interposed between the gauge head 248 and an abutment 304 on each of the plungers 300 is a spring 306 which urges the plunger downwardly. This construction permits each plunger 300 to move upwardly relative to the gauge head 248 when the plunger is seated against its respective aiming projection 84. The plungers 300 are connected by mechanical linkage 308 to respective switches 310. The switches 310 are connected in parallel across a suitable voltage source network 312 which is adapted to supply an output voltage across terminals 314 and 316 when all of the switches 310 are open.

A memory device, designated generally at 318, is adapted to receive an input signal from the terminals 314 and 316 and to provide an output signal across terminals 320 and 322. The memory device comprises a first latch relay 324 having input terminals 326 and 328 connectable by a switch 330 across the terminals 314 and 316. A second latch relay 332 having a pair of input terminals 334 and 336 is also adapted to be connected across the terminals 314 and 316 by the switch 330. The latch relays 324 and 332 are suitably of the type employing a pair of independent energizing coils, one of which displaces the relay armature in one direction where it is latched in position and the other of which is effective to unlatch the armature permitting it to return to its first position. The latch relay 324 is provided with a second pair of input terminals 338 connected across the terminals of voltage source 342 through a switch 343 which is actuated by a relay 347 having input terminals 42' connected to sequence timer terminals 42. The latch relay 332 is provided with a second pair of input terminals 340 connected through switch 344 with the terminals of voltage source 342. The switch 344 is actuated by relay 346 having input terminals 44' connected to sequence timer terminals 44.

The latch relay 324 actuates a switch 348 between opened and closed positions in a first circuit designated generally at 350 which is connectable between output terminals 320 and 322 of the memory device 318 through switch 352 when it is closed against the upper contact 354. The latch relay 332 actuates a switch 356 between opened and closed positions in circuit designated generally 358 which is connectable between output terminals 320 and 322 when the switch 352 is closed against the lower contact 360. The input switch 330 and the output switch 352 are actuated through a ganged connection 362 to relay 370 having input terminals 46' connected to sequence timer terminals 46. It is noted that the input switch 330 is closed against the upper contact when the output switch 352 is closed against the lower contact and vice versa. The output terminals 320 and 322 of the memory device 318 are connected across the input terminals 320' and 322' of the interrupter at the grind station 26 to be described subsequently.

Operation of the apparatus at the gauge station 24 will be described with reference to Figure 4 assuming that the aiming head 16' has been indexed into station 24 by the intermittent drive mechanism 14 under the control of the sequence timer 28. With the aiming head in the indexed position in alignment with the reference head 232 and the gauge head 248, a control voltage is applied to the terminals 38' of the interrupter 242 by the sequence timer terminals 38. The memory device 228 applies a control voltage to the interrupter 240 in accordance with information obtained from the reject null detector 216 when the aiming head 16 was in the aim station 22. If proper aim was achieved, and hence a null output voltage obtained and stored in the memory device 228, the interrupter 240 operates to complete a circuit from the power source 238 to the interrupter 242. If the information stored in memory device 228 indicates a defective lamp, the interrupter 240 operates to interrupt the circuit between the power sources 238 and interrupter 242 and hence no power will be transmitted to the actuator 236 and the actuator will be disabled. The interrupter 242 will be actuated by a control voltage on its terminals 38' from the sequence timer terminals 38 to complete the circuit from the power source 238 to the actuator 236 provided the circuit through interrupter 240 is closed. Under this condition, the actuator 236 will displace the shaft 234, reference head 232, and the gauge head 248 downwardly until the seating ring 256 is seated against the upper surface of the flange 80 on the lamp 64. The actuator will continue to displace the shaft 234 downwardly until the reference head 232 is seated against the stop 246 causing relative movement between the gauge head 248 and reference head 232 which is accommodated by travel of the plunger 250 in the cylinder 252 against the resistance of spring 254. The amount of the relative displacement between the gauge head and the reference head is determined by the point of highest elevation on the upper surface 86 of the rim 80 which limits the downward travel of the gauge head 248. The value of this elevation varies amoing successive lamps because of variation in rim thickness or stack-up, especially in all glass sealed beam lamps, and because of the difference in the inclination of the particular lamp required to direct its light beam in the desired direction with respect to the reference plane at station 22. The value of this relative displacement between the reference head and gauge head is measured by the potentiometer 258 and this information is supplied to the terminals 262 and 266. With the switch 274 closed against the upper contact 270 by relay 298 under the control of sequence timer 28, this information is supplied to the memory device 268. Since the switch 290 is closed against the lower contact 294 this information is retained in the memory device 268 for subsequent use when the aiming head 16' is indexed into the grind station 26.

The gauge head plungers 300 are seated against the respective aiming projections 84 and operate to detect the presence of a defective aiming projection 84. Assuming that one of the aiming projections has been broken off in handling or that it is abnormally short, the plunger 300 associated therewith will not be displaced sufficiently to open the associated switch 310. In this event, even though the remaining switches 310 are open, the voltage supplied from the voltage source network 312 will be short circuited through the closed switch 310 and no output voltage will appear across terminals 314 and 316. Thus, the latch relay 324 will not be energized and the normally closed switch 348 in circuit 350 will remain closed. If all of the aiming projections 84 are in normal condition all of the switches 310 will be opened by the respective plungers 300 and the voltage source network 312 will apply a voltage across terminals 314 and 316 to the memory device 318. In this event, the latch relay 324 will be energized and the switch 348 will be opened. The condition of the switch 348 as controlled by the latch relay 324 thus represents the condition of the aiming projections 84 as being either normal or abnormal and this condition of the switch 348 remains until the aiming head 16' is indexed into the grind station 26 for use at that station as will be explained subsequently.

Upon indexing of the aiming head 16' into the grind station 26, the sequence timer energizes the relay 370 causing the input switch 330 to be closed against the lower contact 334 so that information obtained from the plungers 300 and switches 310 on the succeeding lamp may be stored in the latch relay 332, the operation of which is the same as that just described for latch relay 324. At the same time, switch 352 is closed against the upper contact 354 and the information represented by the condition of circuit 350 including switch 348 is connected across terminals 320 and 322 to be used at the grind station in connection with the lamp 64 in aiming head 16'. After a sufficient time delay for this information to be so used, the relay 347 is energized by the sequence timer 28 and the latch relay 324 is reset and conditioned for use in connection with a lamp in a subsequent aiming head 16.

Also upon indexing of the aiming head 16' into the grinding station, the sequence timer 28 energizes the relay 298 causing the input switch 274 to be closed against the lower contact 280 thus rendering the memory device 276 receptive to information obtained by the potentiometer 258 from the lamp in the following aiming head 16. At the same time the output switch 290 is closed against the upper contact 282 which is effective to apply the output of the memory device 268 across the terminals 286 and 288 to be used at the grind station 26 in conjunction with the operations upon the lamp 64 in aiming head 16'.

*The grind station*

At the grind station 26, shown in Figure 5, means are provided for altering the lamp structure to define an aiming plane thereon having a known angular relation to the direction of the light beam projected from the lamp. The grind station comprises an annular or cup-shaped grinding head or cutting tool 366 of suitable material for removing or displacing glass, such as a diamond-chip grinder or a file-cut tungsten carbide tool. The head 366 is provided with a cutting surface 368 disposed in a plane having a known relation to the reference plane defined by the aiming screen 104 at the aim station 22. It is noted that the cutting surface 368, of annular configuration, is disposed in alignment with the aiming head 16' and is adapted to engage each of the aiming projections 84. Since the angular displacement of the lamp 64 in the aiming head 16' to obtain the desired aim occurs about a point adjacent the plane of the aiming projections, the lateral shifting of the projections is minimized and misalignment with the cutting surface 368 is prevented. The grinding head 366 has a support collar 371 secured to the rotatable and reciprocable spindle or shaft 372. Rotative motion is imparted to the spindle 372 by its connection with the spindle drive 374. Controlled vertical reciprocation, or feed, is imparted to the spindle 372 by the grinder feed mechanism 376. A non-rotatable collar member 378 is suitably affixed for vertical movement with the spindle 372 in alignment with an adjustably positioned abutment or stop element 380. The adjustable abutment 380 serves to positively limit the downward travel or feed of the grinding head 366. Any suitable adjusting mechanism may be provided for the abutment 380 and in the illustrative embodiment takes the form of a wedge member 382 slidable in a guide 384 mounted on a fixed portion of the apparatus such as the fixed table 18. The abutment 380 is positioned vertically by wedging engagement with the wedge member 382 which is positioned by a servomotor 386 through coupling shaft 388. The servomotor 386 is energized for displacement of the abutment 380 in either direction by a servo amplifier 390 having input terminals 286' and 288' connected to the terminals 286 and 288, respectively, at the gauge station 24 in Figure 4.

The grinder feed mechanism 376, suitably electrical or hydraulic, is adapted to be energized from a power source 392. The power source 392 is connected through an interrupter 394 and an interrupter 396 to the grinder feed mechanism 376. The interrupter 394 has a pair of input terminals 48' connected to the sequence timer terminals 48. The interrupter 396 has a pair of input terminals 320' and 322' connected respectively to terminals 320 and 322 at the gauge station 24 in Figure 4.

The operation of the grind station 26 will be explained with reference to Figure 5 assuming that the aiming head 16' carrying the lamp 64 has been indexed into the grind station by rotation of the turret 10 under the control of the sequence timer 28. The value of the stack-up or thickness of the rim 80 of the lamp 64, measured at the gauge station 24, is stored in the memory device 268, station 24. Actuation of the relay 298 by the sequence timer 28 supplies the output of the memory device 268 to the input terminals 286' and 288' of the servo amplifier 390. The servo amplifier 390 energizes the servomotor 386 which positions the adjustable abutment 380 accordingly. This adjustment ensures that the vertical travel or feed of the grinding head 366 will be sufficient to engage all of the aiming projections 84. It also prevents excessive travel of the grinding head 366 and the unnecessary removal of stock from the aiming projections 84.

The interrupter 394 is actuated by the sequence timer terminals 48 to complete a path from the power source 392 to the interrupter 396. The interrupter 396 has its input terminals 320' and 322' connected to the output terminals 320 and 322 of the memory device 318 and the actuation of the interrupter 396 depends upon the condition of the circuit 350 since the output switch 352 thereof is now connected to the upper contact 354. If the lamp 64 has a defective aiming projection 84, the latch relay 324 will not be energized and the switch 348 will be closed. Thus, the interrupter terminals 320' and 322' will be connected across a closed circuit and the interrupter 396 will be actuated. Power from the source 392 to the grinder feed mechanism 376 will be interrupted and the grinder feed mechanism will be disabled.

Also, the grinder feed mechanism 376 will be disabled if the lamp 64 was found to be defective by the reject null detector 216 at the aim station 22. This disabling operation would occur for such a defective lamp because the reject null detector 216 and its associated memory device 228 at the aim station would disable the actuator 236 at the gauge station 24 when the aiming head 16' was indexed to that station, as explained previously. If the actuator 236 is non-operative for a defective lamp, the gauge head plungers 300 are not actuated and the latch relay 324 is not energized. Thus, the switch 348 remains closed and the condition of the circuit 350 represents a defective unit. With switch 348 closed, the interrupter 396 is effective to disable the grinder feed mechanism 376.

If the output of the memory device 318 appearing across terminals 320 and 322 indicates that the lamp 64 is not defective in either of the respects mentioned above, the interrupter 396 is not actuated and the path is completed from the power source 392 to the grinder feed mechanism 376. The grinding head 366, rotatably driven by the spindle 374, is moved downwardly by the grinder feed mechanism 376 into engagement with the aiming projections 84. This downward movement or feed continues until the member 378 engages the adjustable abutment 380. Thus, the cutting surface 368 of the tool 366 modifies the height of the aiming projections 84 by removing stock therefrom so that the outermost surfaces define the desired aiming plane. The aiming plane may be parallel to or in any other predetermined angular relation to the reference plane defined by the aiming screen 104 at the aiming station 22.

*Summary of operation*

When the apparatus is energized the turret 10 is intermittently rotated by the drive mechanism 14 and the aiming head 16' is indexed into the load station 21. During the dwell interval, an operator places and orients the lamp 64 in the aiming head 16'. The aiming head is then indexed into the aim station 22 and a filament of the lamp is energized from voltage source 92. The light beam from the lamp is projected through lens 100 to the aiming screen 104. The elevation and azimuth servomotors displace the respective shafts 94 and 96 to the fully extended position and the aiming head is displaced to one extreme position about the elevation and azimuth axes. The sequence timer 28 and associated relays connect the elevation and azimuth null detectors to the respective servo amplifiers and the aiming head is displaced until null voltages from the detectors are obtained. In this position the light beam of the lamp is in known position with respect to the aiming screen 104 and the aiming head is retained in position. Control voltages are applied to the servo amplifiers to drive the shafts 126 and 142 to the fully retracted position. If the lamp is defective so that proper aim was not achieved, the reject null detector 216 senses this condition and this information is stored in memory device 228.

The turret 10 then indexes head 16' into the gauge station 24. If proper aim of the lamp 64 was not achieved at the aim station the actuator 236 is disabled by interrupter 240. If proper aim was achieved the actuator 236 lowers the reference head 232 and gauge head 248. The rim thickness of lamp 64 is measured by the transducer 258 and this information is stored in memory device 268. The condition of the aiming projections 84 is ascertained by plungers 300 and the presence of a defective projection produces one circuit condition in memory device 318 while another circuit condition is produced if the projections are normal. The actuator raises the heads 232 and 248 and the aiming head 16' is indexed to the grind station 26.

At the grind station the grinder feed mechanism is disabled if the lamp 64 was found to be defective at either station 22 or 24 by actuation of interrupter 396 from memory device 318. The feed of the grinder is set by adjustment of the abutment 380 which is positioned by servomotor 386 in accordance with the rim thickness information stored in memory device 268. The grinding head 366, upon energization of the feed mechanism, engages the aiming projections 84 and reduces the height thereof to define an aiming plane on the lamp having a known angular relation to the aiming screen 104 and hence the direction of the light beam projected from the lamp.

This invention has been described with reference to a particular embodiment which is intended to be illustrative only and is not to be construed in a limiting sense. Many modifications and variations within the scope of the invention will now occur to those skilled in the art. For a definition of the invention, reference is made to the appended claims.

We claim:

1. Apparatus for use in the manufacture of projection lamps of the type including an integrally joined reflector and lense enclosed a light hource, means for energizing the light source, means indicative of light beam direction and including a reference plane, means for positioning the lamp to project the light beam thereof in a known direction with respect to said reference plane, and means for providing the structure of the lamp with plural spaced points which define an aiming plane having a known angular relation to said reference plane.

2. Apparatus for use in the manufacture of projection lamps comprising dirigible support means adapted to receive a lamp and movable about coordinate axes, means adapted to receive substantially all of the light rays projected from the lamp and being indicative of light beam direction and defining a reference plane, means for angularly moving said support means about both of said axes to project the light beam of said lamp in a known direction with respect to the reference plane, and means for providing the lamp with plural spaced reference points defining an aiming plane having a known angular position with respect to the reference plane.

3. In combination, means for supporting a projection lamp for angular movement about coordinate axes, means defining a reference plane, means for displacing the supporting means about both of said axes, means for detecting the directivity, with respect to said reference plane, of the light beam projected from said lamp, and means operable when a predetermined directivity is obtained for defining on said lamp an aiming plane having a known angular relation to said reference plane.

4. In combination, means for positioning a projection lamp to project the light beam thereof in a known direction with respect to a reference plane, means for determining the inclination of said lamp with respect to said reference plane when the desired directivity of the beam is obtained, and means controlled by said last named means for defining on said lamp an aiming plane having a known angular position with respect to said reference plane.

5. In combination, means for supporting a projection lamp for angular movement about a pair of coordinate axes, means defining a reference plane, means for displacing the supporting means about both of said axes, means for detecting a desired directivity, with respect to said reference plane, of the light beam projected from the lamp, means for determining the inclination of the lamp with respect to the reference plane when the desired directivity is obtained, and means controlled by the inclination determining means for providing on said lamp an aiming surface having a known angular relation to said reference plane.

6. Apparatus for manufacturing projection lamps of the type including plural spaced aiming projections comprising support means for said lamp, means for energizing a filament of the lamp to project a light beam therefrom, an aiming screen disposed adjacent the support means and defining a reference plane, said support means being movable to control the directivity of the light beam projected from the lamp, means on said aiming screen for detecting the desired directivity, means for securing the support means in position when the desired directivity is obtained, and a tool having a cutting surface in a known angular relation to said reference plane for altering said aiming projections to define an aiming plane having a known angular relation to the directivity of the light beam projected from said lamp.

7. The combination defined by claim 6 wherein said support means is pivotable in two planes about a common point of rotation and has a support surface disposed adjacent the common point of rotation and adapted to receive the rim of said lamp whereby the aiming projections on the lamp are disposed in a plane closely adjacent said common point.

8. Apparatus for the manufacture of projection lamps of the pre-aimed type comprising an aiming head for the lamp movable about coordinate axes, means for energizing the light source of the lamp for projecting a light beam therefrom, an aiming screen defining coordinate axes and a reference plane, said aiming head being translationally fixed relative to said reference plane, light intensity responsive means disposed on each of said axes for developing an output signal proportional to the displacement of the light beam intensity pattern from the desired directivity, an actuator connected to one of the responsive means for displacing said aiming head about one of its axes to reduce the output signal of the responsive means to null, an actuator connected to the other of said responsive means for displacing said aiming head about one of its axes to reduce the output signal of the other responsive means to null, means for retaining said aiming head in position corresponding to the null conditions, and means operable after the null condition is reached for defining on the lamp an aiming plane having a known angular relation to said reference plane.

9. Apparatus for manufacturing a projection lamp of the pre-aimed type comprising an aiming head for supporting the lamp and being dirigible about azimuth and elevation axes, means for energizing the light source of the lamp for projecting a light beam therefrom, an aiming screen defining a reference plane, said aiming head being translationally fixed relative to said reference plane, a first pair of light intensity responsive means disposed on a line perpendicular to said azimuth axis and a second pair of light intensity responsive means disposed on a line perpendicular to said elevation axis, said responsive means being disposed adjacent spaced apertures defined by the aiming screen and adapted to develop a signal voltage which is a function of the light intensity impinging thereon, an azimuth null detector connected to the first pair of responsive means for deriving an azimuth signal voltage proportional to the difference of the signal voltages applied thereto, azimuth servo means interposed between the azimuth null detector and said aiming head for displacing the aiming head about the azimuth axis to reduce the azimuth signal voltage to null, an elevation null detector connected to the second pair of responsive means for deriving an elevational signal voltage proportional to the difference of the signal voltages applied thereto, elevation servo means interposed between the elevation null detector and the aiming head for displacing the aiming head about the elevation axis to reduce the elevation signal voltage to null, means for securing said aiming head in the position at which null signal voltages are obtained, and means for defining on said lamp an aiming plane having a known angular relation to said reference plane.

10. The combination defined in claim 9 including a reject null detector having a pair of output terminals and first and second pairs of input terminals connected respectively to the output terminals of the elevation and azimuth null detectors, for developing a voltage across the reject null detector output terminals in the absence of null voltage on either of the azimuth or elevation null detector output terminals, and means connected to the reject null detector output terminals for disabling the means for defining the aiming plane.

11. Apparatus for the manufacture of projection lamps of the pre-aimed type comprising a movable support member, an intermittent drive mechanism for said support member, an aiming head supported on said member and being dirigible about an axis, said aiming head being adapted to support a lamp and including means for energizing the light source of the lamp for projecting a light beam therefrom, light intensity responsive means for developing an error voltage responsive to light distribution including means defining a reference plane disposed at an operating station adjacent the path of the movable support member, servo means including a pair of input terminals and a power actuator for displacing said aiming head about said axis, electrical circuit controlled coupling means connecting the actuator to the aiming head, circuit means interposed between said light responsive means and the input terminals of said servo means, a voltage source providing first and second control voltages of opposite polarity, first and second circuit means interposed between the voltage source and the input terminals of the servo means for applying the first and second control voltages respectively, a sequence timer adapted to intermittently energize said drive mechanism, and relay means in each of said circuit means and controlled by said timer for sequentially applying to the input terminals of said servo means the first control voltage for displacing said actuating means to one limit of travel, the error voltage for displacing the actuating means until a null error voltage is obtained, and the other control voltage for displacing the actuating means to the other limit of travel, and relay means also controlled by said timer for energizing and deenergizing said coupling in timed relation to the connection of the control and error voltages.

12. Apparatus for the manufacture of projection lamps of the all glass sealed beam type wherein a reflector and lens are secured together by fusion forming a peripheral rim, a dirigible support member adapted to support a lamp by said rim, means for displacing said support member to direct the light beam projected from said lamp in a known direction with respect to a reference plane, means for securing said support means in position when the desired directivity is obtained, a reference head engageable with a reference surface and supporting a movable gauge head having a gauge surface parallel to said reference plane, actuating means connected to said reference head for displacing the reference head into engagement with said reference surface and for moving the gauge surface into engagement with said rim, transducer means connected between said gauge and reference heads for developing an output signal voltage proportional to the distance therebetween, a cutting tool having a cutting surface in known angular relation to said reference plane and adapted to remove stock from a selected portion of the said lens, adjustable stop means for limiting the feed of said tool, and servo means connected between said transducer and said stop for adjusting the stop in accordance with said signal voltage.

13. Apparatus for the manufacture of projection lamps of the all glass sealed beam type wherein a reflector and lens are joined by fusion at a peripheral rim, an intermittently movable support member and plural spaced aiming heads thereon, said aiming heads adapted to support a projection lamp, operating stations including an aim station, a gauge station and a grind station mounted adjacent the path of said aiming heads and operative successively on given lamp upon movement of the aiming head from one station to the next, means at said aim station for displacing said aiming head to project the light beam from the lamp in a known direction with respect to a reference plane, means for retaining said aiming head in position when the desired directivity is obtained, a measuring device at the gauge station for measuring the thickness of the rim of said lamp, a memory device connected to the measuring device for storing the information obtained thereby, a grinder at said grind station including a cutting surface engageable with said lamp and having a known angular position with respect to said reference plane, adjustable stop means on said grinder for limiting the feed thereof, and means interconnecting said memory device and said stop means for adjusting the feed of said grinder.

14. Apparatus for the manufacture of projection lamps of the type having plural aiming projections protruding from the lamp comprising an aiming head for dirigibly supporting a lamp, means for detecting a desired directivity, with respect to a reference plane, of the light beam projected from the lamp, means for securing said aiming head in position when the desired directivity is obtained, a grinding tool having a cutting surface in known angular position with respect to the reference plane and adapted to engage each of the aiming projections on the lamp, gauge means movable into engagement with said projections after the desired directivity is obtained for ascertaining the required feed of the grinding tool to assure engagement of the cutting surface with each of said projections, and adjustable stop means for said grinding tool controlled by said gauge means.

15. In apparatus for the manufacture of projection lamps of the type having plural aiming projections protruding from the lamp comprising an aiming head for dirigibly supporting the lamp to permit angular displacement of the lamp to obtain a desired directivity of the light beam projected therefrom with respect to a reference plane, means for securing said aiming head in angular position, gauge means aligned with the aiming head and including plural switch actuators each adapted to engage one of the projections on said lamp for detecting defective projections, a seating surface on said gauge means adapted to engage said lamp to cause displacement of the actuators by the projections, circuit means including plural switches each associated with a different one of said actuators and responsive to the displacement thereof, and control means connected to said circuit means for signalling the failure of actuation of any of said switches.

16. Apparatus for the manufacture of projection lamps of the type having plural aiming projections protruding from the lamp comprising an intermittently movable support member provided with plural spaced aiming heads each adapted for dirigibly supporting a projection lamp, plural operating stations including an aim station, a gauge station and a grind station mounted adjacent the path of movement of said aiming heads and being operative successively on a given lamp upon movement of the aiming head from one station to the next, means at said aim station for angularly displacing said aiming head to project the light beam from the lamp in a known direction with respect to a reference plane, means for retaining said aiming head in angular position when the desired directivity is obtained, means at the gauge station including a movable gauge head adapted for engagement with said lamp, plural actuators mounted on said gauge head each being adapted for engagement with a different one of said aiming projections, a switch operable by each of said actuators and circuit means common to the switches, said circuit means being energized or deenergized depending upon whether all or less than all of said switches are operated by the respective actuators, a memory device connected with said circuit means for storing information relative to the condition of the circuit means, grinding means at said grind station for defining an aiming plane on said lamp having a known angular position with respect to said reference plane, and means connected between said memory device and said grinding means for disabling the grinding means if less than all of said switches were operated.

17. In apparatus for the manufacture of lamps of the type which have plural aiming projections thereon spaced circumferentially of the lamp, a dirigible aiming head for supporting the lamp, means for energizing a filament of the lamp to project a light beam therefrom, aiming means defining a reference plane, means for securing the aiming head in position when the light beam from the lamp is projected in a known direction with respect to the reference plane, an annular grinding head having a grinding surface in known angular relation to the reference surface, said grinding surface being adapted to engage each of the aiming projections on the lamp, and means for rotating said grinding head to reduce the height of the projections for defining an aiming plane on the lamp.

18. Apparatus for manufacturing projection lamps comprising an intermittently movable support member, an aiming head movable about azimuth and elevation axes mounted on the support member and adapted to support a lamp having plural spaced aiming projections, a plurality of operating stations including an aim station, gauge station and grind station disposed adjacent the path of said aiming head, means for indexing said aiming head into said stations successively, said aim station including means for energizing a filament of the lamp, an aiming screen defining a reference plane, a photocell pickup system associated with the screen and responsive to light intensity distribution on said screen for detecting the directivity of the light beam projected from said lamp, said pickup system including means for producing an elevation error voltage when the beam departs from the desired directivity about the elevation axis, motive power means responsive to the elevation error voltage and connected to the aiming head for displaying the aiming head to reduce the elevation error voltage to null, said pickup system also including means for producing an azimuth error voltage when the beam departs from the desired directivity about the azimuth axis, motive power means responsive to the azimuth error voltage and connected to the aiming head for displacing the aiming head about the azimuth axis to reduce the azimuth error voltage to null, means for securing said aiming head in position when the desired directivity is obtained, a reject null detector connected to both the elevation and azimuth error voltage producing means for producing an output voltage in the absence of null in either of the error voltages, a memory device connected to the null detector for storing information relative to the condition of the reject null detector for use after index of the aiming head into the gauge station, said gauge station including a reference head and an actuator therefor, control means for the actuator connected to the memory device for disabling the actuator in response to the absence of a null signal stored in said memory device, means for energizing the actuator upon index, stop means for seating the reference head, a gauge head supported by the reference head and capable of movement relative to the reference head, the gauge head including a seating member adapted to engage the rim of the lamp, transducer means interposed between the gauge head and reference head for producing a voltage proportional to the distance therebetween when the gauge and reference heads are seated, a second memory device connected to the transducer for storing the voltage for use after index of the aiming head to the grind station, plural switch means carried by the gauge head and adapted to be actuated by engagement with respective aiming projections on said lamp, circuit means responsive only to actuation of all of said switch means, a third memory device connected to said circuit means for use after index of the aiming head into the grind station, said grind station including a cutting tool having a cutting surface disposed in a plane having a predetermined angular relation to said reference plane and adapted to engage each of said projections, actuating means for said cutting tool, control means for the actuating means connected to the third memory device and adapted to disable the actuating means if less than all of the switch means were actuated, means for controlling the feed of said cutting tool and regulating means therefor connected to said second memory device.

19. Apparatus for use in the manufacture of projection lamps of the type enclosing an integrally joined reflector and lens including a light source, means for energizing the light source, means indicative of light beam direction and including a reference plane, means for positioning said reference plane and lamp relative to each other to project the light beam in a known direction with respect to said reference plane, and means for providing the structure of said lamp with plural spaced points which define an aiming plane having a known angular relation to said reference plane.

References Cited in the file of this patent
UNITED STATES PATENTS

| | | |
|---|---|---|
| 1,241,512 | Harrington | Oct. 2, 1917 |
| 1,687,504 | Moffit et al. | Oct. 16, 1928 |
| 1,712,147 | Kelsea | May 7, 1929 |
| 1,760,693 | Gustin | May 27, 1930 |
| 2,154,500 | Elemdorf | Apr. 18, 1939 |
| 2,563,435 | Thorburn | Aug. 7, 1951 |

UNITED STATES PATENT OFFICE

CERTIFICATE OF CORRECTION

Patent No. 2,880,557                                    April 7, 1959

Harold E. Todd et al.

It is hereby certified that error appears in the printed specification of the above numbered patent requiring correction and that the said Letters Patent should read as corrected below.

Column 6, line 62, after the numeral "142" insert -- and --; column 10, line 39, for "amoing" read -- among --; column 13, line 59, claim 1, for "lense enclosed a light hource" read -- lens enclosing a light source --; column 16, line 35, claim 13, before "given" insert -- a --.

Signed and sealed this 6th day of October 1959.

(SEAL)
Attest:

KARL H. AXLINE                                         ROBERT C. WATSON
Attesting Officer                                   Commissioner of Patents